United States Patent [19]
Larkins, Jr. et al.

[11] 3,972,811
[45] Aug. 3, 1976

[54] WASTE CONVERTER SYSTEM AND METHOD

[76] Inventors: Allan T. Larkins, Jr., 120 Canal St., San Rafael, Calif. 94901; Dalton L. Alander, 1513 Sarkesian Drive, Petaluma, Calif. 94952

[22] Filed: Apr. 30, 1975

[21] Appl. No.: 573,016

[52] U.S. Cl. ............................. 210/71; 48/197 A; 55/248; 60/317; 210/123; 210/152; 210/180; 210/220; 123/3; 123/119 R; 261/16
[51] Int. Cl.² ......................................... C02C 5/06
[58] Field of Search ............... 60/317; 123/3, 119 R; 48/197 A; 210/71, 123, 152, 180, 187, 220; 261/16

[56] References Cited
UNITED STATES PATENTS

| | | | |
|---|---|---|---|
| 2,638,444 | 5/1953 | Kappe | 210/12 X |
| 3,362,887 | 1/1968 | Rodgers | 48/197 A |
| 3,597,769 | 8/1971 | Brainard et al. | 210/71 X |
| 3,775,978 | 12/1973 | Body | 210/152 X |
| 3,856,672 | 12/1974 | Boswinkle et al. | 210/71 X |
| 3,864,252 | 2/1975 | Morin et al. | 210/71 X |

Primary Examiner—John Adee
Attorney, Agent, or Firm—Naylor, Neal & Uilkema

[57] ABSTRACT

A human conveyance having a toilet and a fuel burning engine is provided with an arrangement for converting waste from the toilet to a combustible gas and for feeding the gas to the engine where it is burned as a fuel additive to increase the gas mileage of the conveyance.

5 Claims, 1 Drawing Figure

U.S. Patent   Aug. 3, 1976   3,972,811
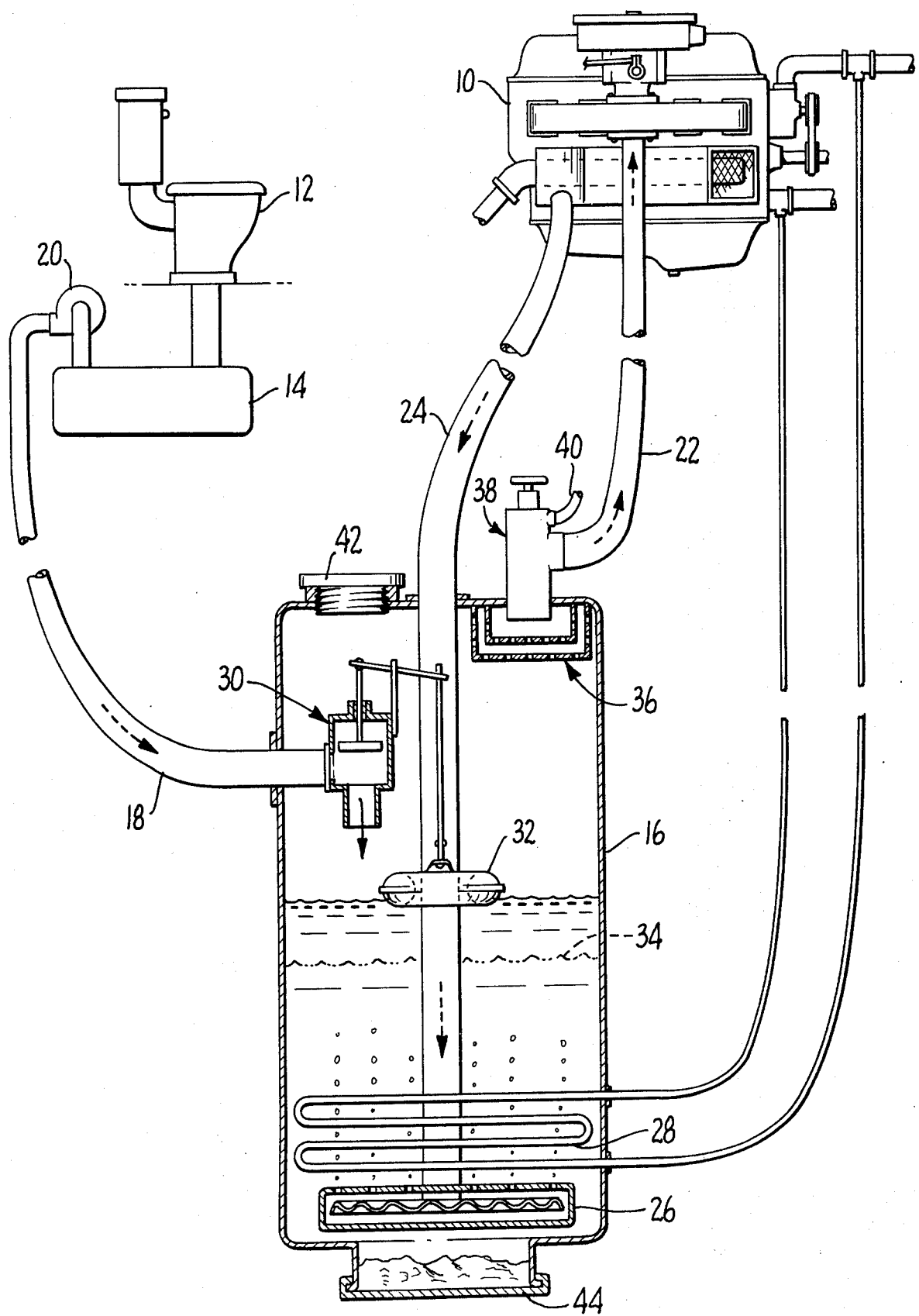

WASTE CONVERTER SYSTEM AND METHOD

The essential object and purpose of the invention is to provide a waste converter system for a vehicle having an internal combustion engine of any type whereby the waste is converted to a combustible gas which is burned in the engine along with the normal fuel in order to conserve normal fuel energy.

This and other objects and advantages of the invention will be apparent from the following description taken in conjunction with the drawing forming part of this specification, and in which there is semi-schematically shown the waste converter system of the invention.

With reference to the drawing, a human conveyance which is furnished with an internal combustion engine 10 and a toilet 12 is provided, in interconnecting relation therebetween, with the waste converter system of the invention comprising a holding tank 14, a converter tank 16, an inlet line 18, including a pump 20, interconnecting the tanks 14 and 16, an outlet line 22 interconnecting the tank 16 with the engine intake manifold system, a conduit 24 adapted to deliver warm air from the engine compartment to a warm air diffuser 26 located at the bottom of tank 16, and heating coils 28 connected to the radiator system of the engine 10.

The inlet line 18 is provided within the tank 16 with a valve 30 which is under the control of float 32 which is concentrically arranged to the air supply conduit 24. When the level of the pumpable sludge within tank 16 approaches the lower end of valve 30 the float 32 closes the valve to prevent overfill of the tank 16, while when the sludge level drops to approximately the dotted line level 34, a switch, not shown, under the control of the float valve system 30, 32 is operated to activate the pump 20 to furnish additional sludge to the tank 16.

Within the tank 16 adjacent the inlet of line 22 there is provided a baffle system 36 to prevent the admission of non-gaseous waste into line 22. In association with the inlet end of line 22 there is provided a pre-set volume control valve 38 and pressure relief means for tank 16 comprising line 40 which connects to a relief valve, not shown.

The treatment of the sludge within the tank 16, that is, the furnishing of heat and oxygen to the sludge via the heating means 28 and the oxygen-addition means 24, 26 converts the sludge to a combustible gas which may be continuously fed as an energy additive to the normal fuel. The addition may be made in the case of a gasoline-air engine at a point between the carburetor and the cylinders but preferably the converter gas is mixed with the total air prior to carburetion. In jet and diesel engines the addition of the converter gas would be preferably made in advance of the combustion chambers.

The tank 16 is provided with a removable top cap 42 and a removable bottom cap 44 for periodic cleanout of the tank.

The essence of the present invention is the conversion of the waste or sludge into a combustion gas which is burned in the engine of the vehicle as an energy-saving fuel additive. Actual testing with a gasoline-powered truck shows a gas mileage increase from the norm of 10 miles per gallon to nearly 14 miles per gallon over a 30 day testing period. The present invention is therefore to be sharply contrasted with the process and practices shown in Body et al U.S. Pat. No. 3,775,978 for "Waste Disposal System and Method" wherein solid and/or liquid state waste is delivered through an elaborate feed pump and metering valve arrangement to various hot zones in the engine area where the waste is burned and vaporized just to get rid of it and not at all to utilize its energy saving fuel additive potential. Instead of the feed pump and metering valve arrangement of the Body et al patent, the physical conversion system of the present invention is motivated or actuated only by the negative pressure of the intake manifold. No additional power or source of power is required. Warm air from the engine compartment is suctioned by the intake manifold negative pressure through the pre-heated sludge, converting the latter to a gaseous fuel mixture which is burned in the engine as a fuel additive and not merely consumed in the engine heat system as a waste product. It is of critical importance that only a gas, and not liquid or solid state waste, be admitted to any part of the engine, and for this purpose the subject conversion system employs a complex of safety baffles 36 to protect the engine against aspiration into it of harmful liquid and solid waste products.

As will be appreciated from the foregoing, practically the only moving part of the subject conversion system is the float valve 32 which slides up and down the air intake shaft 24.

What is claimed is:

1. In combination with a vehicle having an internal combustion engine, means to convert waste to a combustible gas and to add said gas to the engine to conserve usage of the normal fuel, said means comprising a converter tank to contain the waste and having a gas outlet line in communication with the intake manifold of the engine, and means to convert the waste to combustible gas comprising means to pass heated air through said waste.

2. In combination with a vehicle having an internal combustion engine, means to convert waste to a combustible gas and to add said gas to the engine to conserve usage of the normal fuel comprising a converter tank to contain the waste and having a gas outlet line in communication with the intake manifold of the engine, an air supply line connected to an air diffuser within the tank and operable to deliver air to said diffuser under the difference in pressure between ambient atmospheric pressure and intake manifold pressure, and a heater to heat the waste as air is diffused therethrough to thereby convert the waste to combustible gas.

3. In combination with a vehicle having an internal combustion engine and a toilet, means to convert waste to a combustible gas and to add said gas to the engine to conserve usage of the normal fuel, said means comprising a holding tank connected to the toilet, a converter tank having a gas outlet line in communication with the intake manifold of the engine, a waste delivery line and a pump to pump waste from the holding tank into the converter tank, a valve in the converter tank to open and close the outlet end of said delivery line, a float mounted for guided vertical movement in the converter tank to open and close said valve, switch means responsive to the condition of said valve to activate and deactivate said pump, an air supply line connected to an air diffuser within the converter tank and operable to deliver air to said diffuser under the difference in pressure between ambient atmospheric pressure and intake manifold pressure, and a heater to heat the waste as air is diffused therethrough to thereby convert the waste to combustible gas.

4. The combination of claim 3, said air supply line extending vertically within the converter tank, said float being annular and being concentric to said air supply line for guided vertical movement.

5. A method for conserving the consumption of normal fuel in the operation of a vehicle having an internal combustion engine and a toilet comprising converting toilet waste to combustible gas and mixing said gas with normal fuel and burning them together in said engine.

* * * * *